Oct. 9, 1934.  L. M. ZELL  1,976,275
LAYER CAKE HOLDER
Filed Nov. 7, 1933
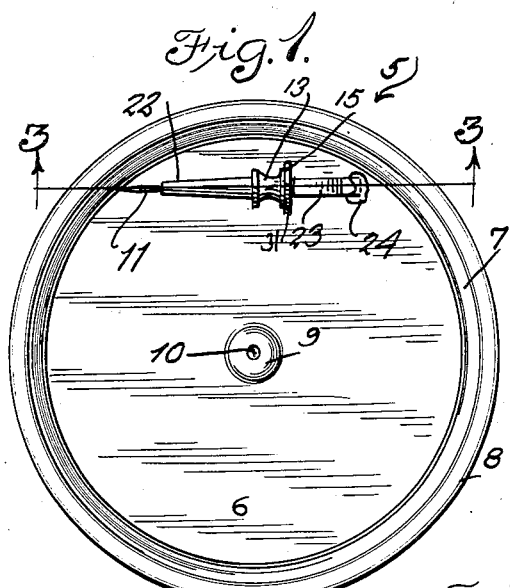
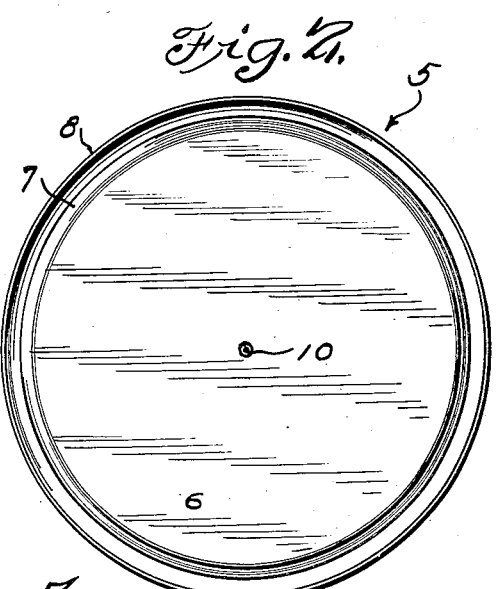
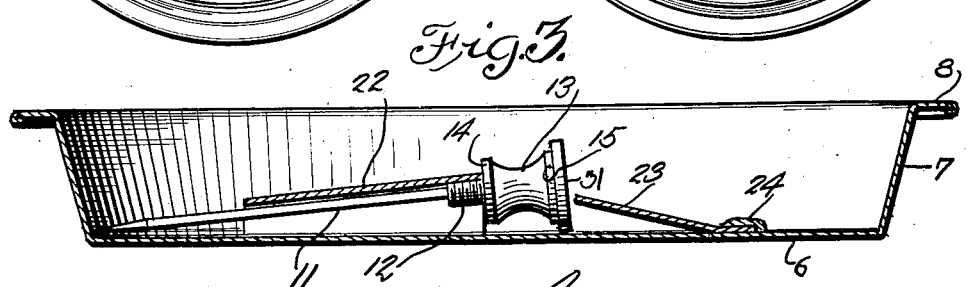
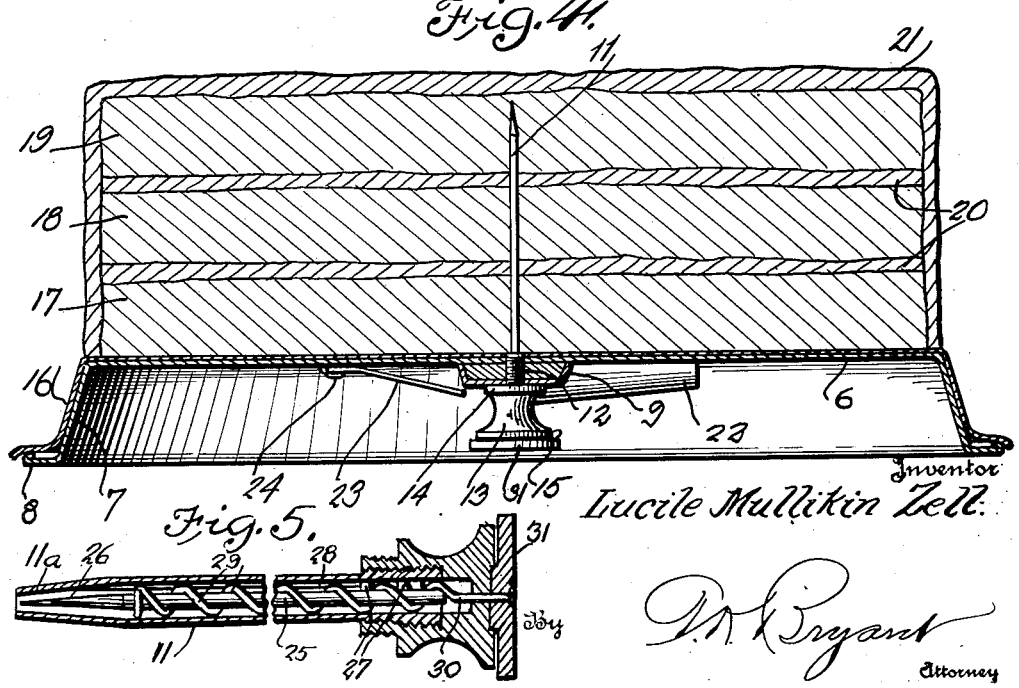
Inventor
Lucile Mullikin Zell.
By D. L. Bryant
Attorney Patented Oct. 9, 1934

1,976,275

UNITED STATES PATENT OFFICE 1,976,275

LAYER CAKE HOLDER

Lucile Mullikin Zell, Baltimore, Md.

Application November 7, 1933, Serial No. 697,051

6 Claims. (Cl. 91—2)

This invention relates to certain new and useful improvements in layer cake holders.

The primary object of the invention is to provide a holder for the layers of a cake for centering the layers while coating or icing the same.

In the icing of layer cakes when the coating or icing is in a relatively soft or semi-fluent condition and when the layers of the cake are of varying depths adjacent opposite side edges, considerable difficulty is experienced in preventing sliding or shifting movements of the superposed layers relative to the lower layers of the cake during the coating or icing operation and while the icing sets and an important object of this invention is to provide a cake holder in the form of a pan adapted to have a layer centering pin perpendicularly positioned centrally of the pan for piercing each layer centrally thereof as successively placed thereon during the icing operation.

It is a further object of the invention to provide a cake holder of the foregoing character wherein the layer centering pin that is detachably engaged with the pan to project perpendicularly and centrally therefrom with a retainer device for the centering pin for confining the pin within the pan when the pin is out of use and to prevent loss or misplacement thereof.

A further object of the invention is to provide a centering pin for cake layers wherein a cake testing wire is reciprocably housed within the pin that is of tubular construction with the wire projectable from the tubular pin for insertion in cakes while being baked to determine whether or not the cake has been sufficiently baked, or the stage of baking.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a cake holder constructed in accordance with the present invention showing a marginally flanged pan with the layer centering pin removably retained within the pan;

Figure 2 is a bottom plan view of the cake holder showing the central opening in the bottom thereof for the threaded reception of the layer centering pin;

Figure 3 is a vertical longitudinal sectional view taken on line 3—3 of Figure 1, showing the retainer device for the layer centering pin;

Figure 4 is a vertical longitudinal sectional view of the cake holder with the centering pin projecting perpendicularly therefrom and showing the iced layers of a cake centered by the pin; and Figure 5 is a longitudinal sectional view of the pin showing the projectable cake testing wire employed in the baking of a cake.

Referring more in detail to the accompanying drawing, there is illustrated a cake holder adapted for the support of cake layers during the icing of the layers and to retain the layers from relative sliding movements during the icing and setting of the icing of the layers. The cake holder includes a pan 5 of general construction similar to an ordinary layer cake pan and includes a bottom wall 6 having an upwardly and outwardly extending side wall 7 terminating in the usual reinforcing bead 8. An upstanding boss 9 rises centrally of the bottom 6 of the pan 5 and is provided with a threaded bore 10 for the purchase of threads on a layer centering pin.

The layer centering pin as shown in detail in Figure 5 comprises a tubular pin shank 11 tapering at one end as at 11a and externally threaded at its other end as illustrated. A tubular bead 13 is internally threaded for engagement with the threaded end of the tubular pin and said bead has a forwardly extending externally threaded boss 12 receivable in the threaded bore 10 of the boss 9 as shown in Figure 4. A cake testing wire is associated with the tubular pin 11 and includes a wire 25 normally housed within the tubular pin and having a pointed end 26 adjacent the tapered end 11a of the pin. A pair of spaced lugs 27 project laterally of the inner end of the wire and extend into a longitudinal groove 28 formed in the inner face of the tubular pin 11. Means is provided for projecting the testing wire 25 outwardly of the tubular pin and retracting the same into inoperative position and includes a spiral feed screw wire 29 surrounding the pin and threaded between the lugs 27, the inner end 30 of the feed screw wire freely extending through the end of the tubular bead 13 and made rigid with an operating disk 31 that in effect is swivelled at the outer end of the bead 13.

In the use of the cake holder, the pan 5 is inverted as shown in Figure 4 and a paper or other sheet 16 is placed over the pan to be later utilized in the removal of the iced layer cake from the holder. The centering pin has the shank portion 11 thereof passed through the threaded bore 10 from the underside of the pan and the threaded boss 12 of the centering pin bead is moved into threaded engagement with the bore 10 of the boss 9, the abutment 14 of the bead 13 contacting the boss as shown in Figure 4 and when so disposed, the abutment end 15 of the head and the disk 31 are spaced upwardly of the side wall bead 8 so that the pan may set level upon a table or other support. The several cake layers 17, 18 and 19 are successively placed upon the centering pin shank 11 with each layer successively iced or coated and the superposed layers 18 and 19 are restrained from relative sliding movements, due to unevenness of layers or fluidity of the icing. The icing between the layers is designated by the reference character 20 and a coating 21 of icing completely covers the top layer 19 and the side edges of the several layers. The centering pin retains the several layers in position during the setting of the icing. The completely iced layer cake is removed from the holder with the aid of the paper sheet support 16 and the internal perforation resulting from the use of the centering pin is entirely hidden from view so that the beauty of the cake is not marred in any manner.

The centering pin is disengaged from the boss 9 and is attached to the pan 5 by a keeper device upon the bottom wall 6 within the side wall 7. The keeper device includes a channel guide 22 of U-shape in cross section and rising from the bottom wall 6 to receive the pin shank 11 with the abutment end 14 of the head 13 of the centering pin engaged with the adjacent end of the channel guide 22. A resilient clip 23 has one end 24 anchored to the bottom wall 6 of the pan and has its free end positioned in the path of movement of the centering pin and for engagement with the abutment end 15 and disk 31 to prevent accidental displacement of the centering pin from engagement with the pan 5. To remove the centering pin, it is only necessary to depress the free end of the spring clip 23 to position the same out of the retracting path of movement of the centering pin as will be obvious from an inspection of Figure 3.

When the device is employed for the centering of cake layers or the like, the testing wire is retracted into the pin shank 11, but when it is desired to test the baking of a cake, the disk 31 is rotated for operating the feed screw wire 29 for projecting the testing wire 25 outwardly of the tubular pin 11, rotation of the spiral feed screw wire being engaged with the lugs 27 that move through the groove 28 to prevent rotation of the testing wire and assure feeding thereof inwardly and outwardly of the tubular pin. When the testing wire is projected, the same is employed for piercing a baking cake layer or the like to determine when or not the cake has been sufficiently baked.

From the above detailed description of the invention, it is believed that the construction and use thereof will at once be apparent, it being understood that the cake holder and its centering pin may be of any configuration desired for the proper support of cake layers of different designs and the holder may also be used for the support of a loaf cake or the like while being iced or otherwise decorated.

While there is herein shown and described the preferred embodiment of the invention, it is nevertheless to be understood that minor changes may be made therein without departing from the spirit and scope of the invention as claimed.

I claim:—

1. A cake holder comprising a pan having an opening centrally of the bottom thereof and a pin adapted to be inserted in the opening and project upwardly of the bottom of the pan, said pin being of tubular formation, a cake testing wire within the pin and means for projecting the wire from the pin.

2. A cake holder comprising a pan having an opening centrally of the bottom thereof and a pin adapted to be inserted in the opening and project upwardly of the bottom of the pan, and a keeper device for the pin carried by the pan, said pin being of tubular formation, a cake testing wire within the pin and means for projecting the wire from the pin.

3. In a cake holder of the character described, a pan having a threaded opening centrally of the bottom thereof and a pin having a threaded portion adapted to be engaged in the threaded opening and project upwardly of the bottom of the pan, said pin being of tubular formation, a cake testing wire within the pin and means for projecting the wire from the pin.

4. A cake holder comprising a pan having an opening centrally of the bottom thereof and a pin adapted to be inserted in the opening and project upwardly of the bottom of the pan, said pin being of tubular formation, a non-rotatable testing wire slidably mounted in the tubular pin and a spiral feed screw wire for projecting and retracting the testing wire.

5. A cake holder comprising a pan having an opening centrally of the bottom thereof and a pin adapted to be inserted in the opening and project upwardly of the bottom of the pan, and a keeper device for the pin carried by the pan, said pin being of tubular formation, a non-rotatable testing wire slidably mounted in the tubular pin and a spiral feed screw wire for projecting and retracting the testing wire.

6. In a cake holder of the character described, a pan having a threaded opening centrally of the bottom thereof and a pin having a threaded portion adapted to be engaged in the threaded opening and project upwardly of the bottom of the pan, said pin being of tubular formation, a non-rotatable testing wire slidably mounted in the tubular pin and a spiral feed screw wire for projecting and retracting the testing wire.

LUCILE MULLIKIN ZELL.